(12) United States Patent
Gille et al.

(10) Patent No.: US 7,448,951 B2
(45) Date of Patent: Nov. 11, 2008

(54) UNIVERSAL JOINT

(75) Inventors: Wilfried Gille, Dorsten (DE); Andreas Wons, Moers (DE)

(73) Assignee: Spicer Gelenkwellenbau GmbH & Co. KG, Essen (DE)

( * ) Notice: Subject to any disclaimer, the term of this patent is extended or adjusted under 35 U.S.C. 154(b) by 57 days.

(21) Appl. No.: 11/015,303

(22) Filed: Dec. 17, 2004

(65) Prior Publication Data

US 2005/0137023 A1 Jun. 23, 2005

(30) Foreign Application Priority Data

Dec. 17, 2003 (DE) ................. 103 59 142

(51) Int. Cl.
*F16D 3/43* (2006.01)
(52) U.S. Cl. ..................... 464/132; 464/134
(58) Field of Classification Search ......... 464/132–136; 384/569
See application file for complete search history.

(56) References Cited

U.S. PATENT DOCUMENTS

| 4,412,827 | A | * | 11/1983 | Petrzelka et al. | ........ 464/132 X |
| 5,286,117 | A | * | 2/1994 | Wojan et al. | ........... 384/569 X |
| 5,324,119 | A | * | 6/1994 | Harimoto et al. | ........ 384/569 X |
| 6,089,758 | A | * | 7/2000 | Ward | |
| 6,923,726 | B1 | * | 8/2005 | Lindenthal et al. | .......... 464/132 |

FOREIGN PATENT DOCUMENTS

DE  1 806 800      12/1959
DE  196 37 553     11/1997
JP  02180316       7/1990
JP  2000/104750    4/2000
WO  WO 01/14757 A1 * 3/2001

OTHER PUBLICATIONS

Gelenke and Gelenkwellen ("Joints and universal shafts") by H.-Ch. Graf von Seherr-Thoss, F. Schmelz and E. Aucktor, second edition Springer Verlag, p. 246, picture 5.5 (undated).

* cited by examiner

*Primary Examiner*—Greg Binda
(74) *Attorney, Agent, or Firm*—MacMillan, Sobanski & Todd, LLC

(57) ABSTRACT

A universal joint includes a first joint yoke and a second joint yoke having respective base portions. Each of the joint yokes has two yoke arms that are attached on the respective base portions. Each of the yoke arms ends in a free end and has an inner face facing toward the longitudinal axis and an outer face facing away from the inner face. Each of the yoke arms has a bearing bore extending between the outer face and the inner face. The inner face of each of the yoke arms has a first recess that is open toward the free end and that ends in the corresponding bearing bore. A journal cross assembly includes a journal cross having four circular cylindrical trunnions arranged at right angles toward each other, each trunnion supporting a bearing bushing having a cylindrical envelope face and a cylindrical bore. The bearing bushings are supported on the trunnions by rolling members. The envelope face, in the area of the first recess, has a first support-free portion and, diametrically to the first support-free portion, a second support-free portion that is provided between the bearing bushing and the corresponding bearing bore.

8 Claims, 5 Drawing Sheets

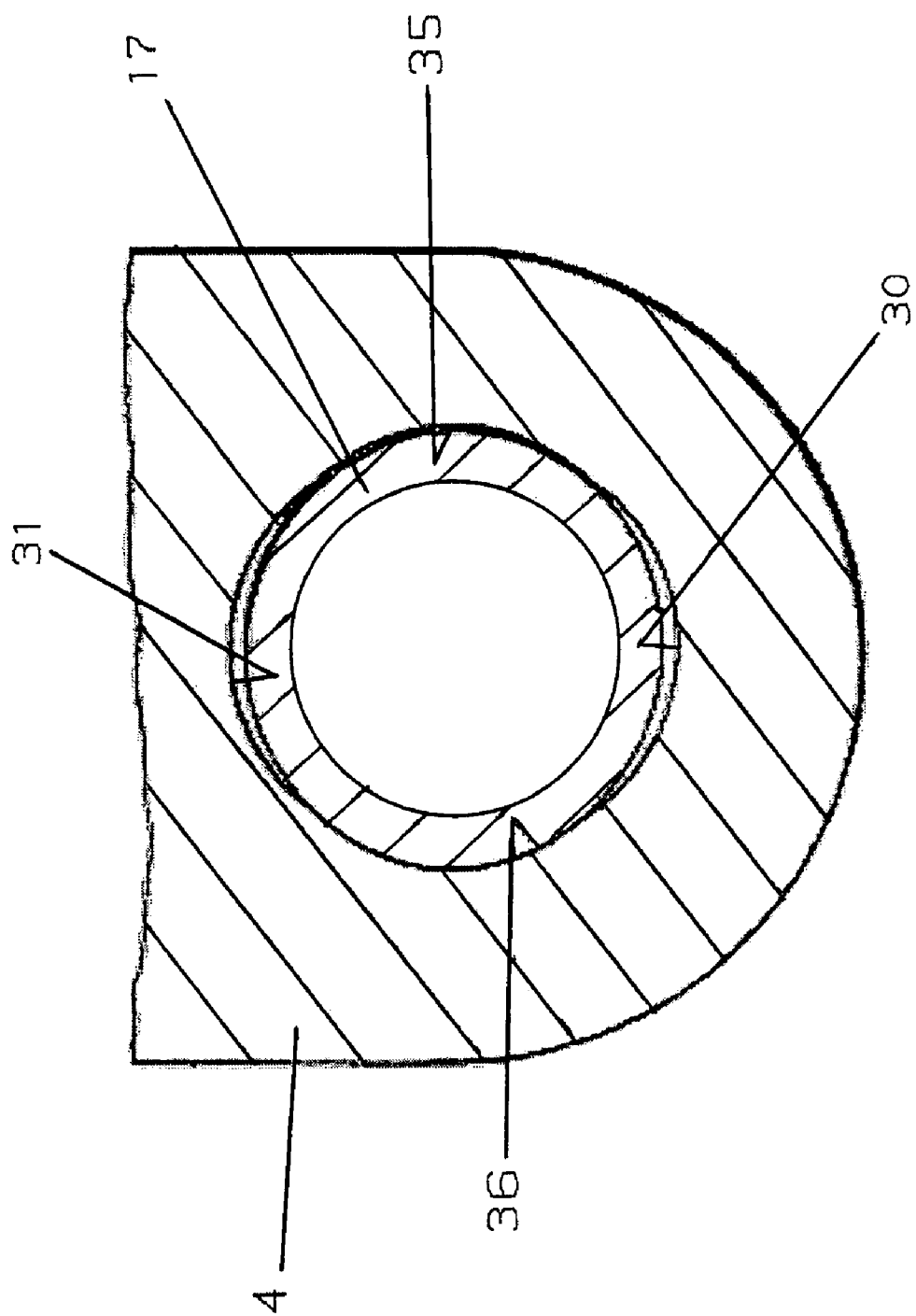

UNIVERSAL JOINT

BACKGROUND OF THE INVENTION

This invention relates to a universal joint that is formed from a first joint yoke and a second joint yoke, each having a base portion that is centered on a longitudinal axis of rotation. From this base portion, two yoke arms extend that are attached to the base portion, are offset in opposite directions from the longitudinal axis, and end in respective free ends. Each yoke arm has an inner face that faces toward the longitudinal axis. Facing away from the inner face, each of the yoke arms has an outer face.

In each of the yoke arms, a cylindrical bearing bore is provided that extends between the outer face and the inner face. The bearing bores of both of the yoke arms are arranged on a common axis that intersects the longitudinal axis at a right angle. In the inner faces of both of the yoke arms, a recess is provided so that a step is formed in which a portion is provided that is open to the bearing bore. The two joint yokes are connected by a journal cross having four circular cylindrical trunnions that are arranged at right angles to each other. For each of the trunnions, a bearing bushing having a cylindrical envelope face and a cylindrical bore is provided. The bearing bushings are rotatably supported on each of the trunnions by interposed rolling members in form of rollers contained within the bearing bushings. The bearing bushings are, respectively, accommodated with their envelope face in the bearing bores of the yoke arms. By means of the opening, a support-free portion is achieved in which the bearing bushing is not supported by the mating yoke arm. Such a joint yoke is, for example, shown in the book "Gelenke and Gelenkwellen ("Joints and universal shafts") by H.-Ch. Graf von Seherr-Thoss, F. Schmelz and E. Aucktor, second edition Springer Verlag, page 246, picture 5.5.

Such a closed embodiment of the yoke arms of a joint yoke for a universal joint has the advantage that it facilitates the assembly of a journal cross, as a space is provided by the opening through which the trunnion of a journal cross can be initially inserted into the mating bearing bore before the bearing bushing is mounted from the outside.

In universal joints for the transmission of high torques, i.e., a universal joint that has a corresponding large trunnion diameter and, therefore, corresponding large bearing bores in the yoke arms, it has been found that, for example, also in comparison to joint designs in which the yoke arms are separated, to be able to mount a journal cross, a distinctly worse bearing support is achieved so that the bearing life time is distinctly reduced. Decisive for this worsening is, in the closed joint yoke, the existence of the recess in the area of the free end of the yoke arms.

This invention is based on the object to propose a universal joint that, although a recess is provided enabling the insertion of a journal cross, is distinctly superior concerning bearing life time.

SUMMARY OF THE INVENTION

This invention relates to a universal joint having a first joint yoke and a second joint yoke that have respective base portions centered on a longitudinal axis. Each of the joint yoke has two yoke arms that are attached on the base portion, that are off-set in opposite directions from the longitudinal axis and project therefrom, and that each ends in a free end. Each of the yoke arms has, towards the longitudinal axis, an inner face and, facing away from the inner face, an outer face. Each of the yoke arms also has a circular cylindrical bearing bore extending between the outer face and the inner face, wherein the bearing bores of both yoke arms are arranged on a common axis that intersects the longitudinal axis at a right angle. Each of the yoke arms has, in the inner face, a first recess that is open toward the free end and ending in the corresponding bearing bore. A journal cross assembly, which has a journal cross with four circular cylindrical trunnions arranged at a right angle towards each other, has per trunnion a bearing bushing with a circular cylindrical envelope face and a circular cylindrical bore. The bearing bushings are supported by interposition of rolling members in form of rollers on the corresponding trunnion and are received, respectively, with their envelope face in a bearing bore. The envelope face, in the area of the first recess, has a first support-free portion and, diametrically to the first support-free portion, a second support-free portion that is provided between the bearing bushing and the corresponding bearing bore.

Of advantage in this embodiment is that by provision of the second support-free portion, a distinctly improved bearing life time is achieved because of a better bearing load distribution. By the single-sided recess, an inclined position can be produced. The support of the trunnion in the rotational torque direction is maintained to a sufficient degree. The support exceeds even in the area close to the longitudinal axis, an area of at least 90°. The bearing bushing can laterally deflect relatively symmetrically. As the compression between the bearing bushing and the carrier cannot occur here, the bore of the bearing bushing could be smaller in this area concerning the diameter in the loading direction than in the area, fully supported over the complete circumference of the bearing bushing, i.e., the upper area of the bearing bushing remote to the longitudinal axis. Thus, additionally a better load distribution is achieved also in the direction of the axis of the bearing bushing and the bearing bore and therewith of the bearing.

Especially advantageous is when the second support-free portion corresponds dimensionally to the first support-free portion. Preferably, the second support-free portion corresponds dimensionally to the first support-free portion. There are two possibilities to achieve the second support-free portion. The first embodiment provides that the second support-free portion is provided by a second recess that is arranged towards the base portion in the inner face of the yoke arms and ends diametrically to the first recess in the bearing bore. The second embodiment provides that the second support-free portion is formed as a flattened face or a recess in the envelope face of the bearing bushing.

In the first embodiment, it is especially advantageous that already in the manufacture of the bearing bore, a higher accuracy is achieved, as a departing of the tool by the discontinued cut, when machining the bearing bore by a drill spindle, is prevented so that the bearing bushing will not take up an inclined position in this area during the assembly.

Two preferred embodiments and a shaft, in which these two embodiments can be used, are shown schematically in the drawings.

Various objects and advantages of this invention will become apparent to those skilled in the art from the following detailed description of the preferred embodiments, when read in light of the accompanying drawings.

BRIEF DESCRIPTION OF THE DRAWINGS

FIG. 3A is an enlarged sectional elevational view of a portion of the yoke and a bearing bushing of the first embodiment of the universal joint illustrated in FIGS. 1 and 2.

DETAILED DESCRIPTION OF THE PREFERRED EMBODIMENTS

Figure 1:
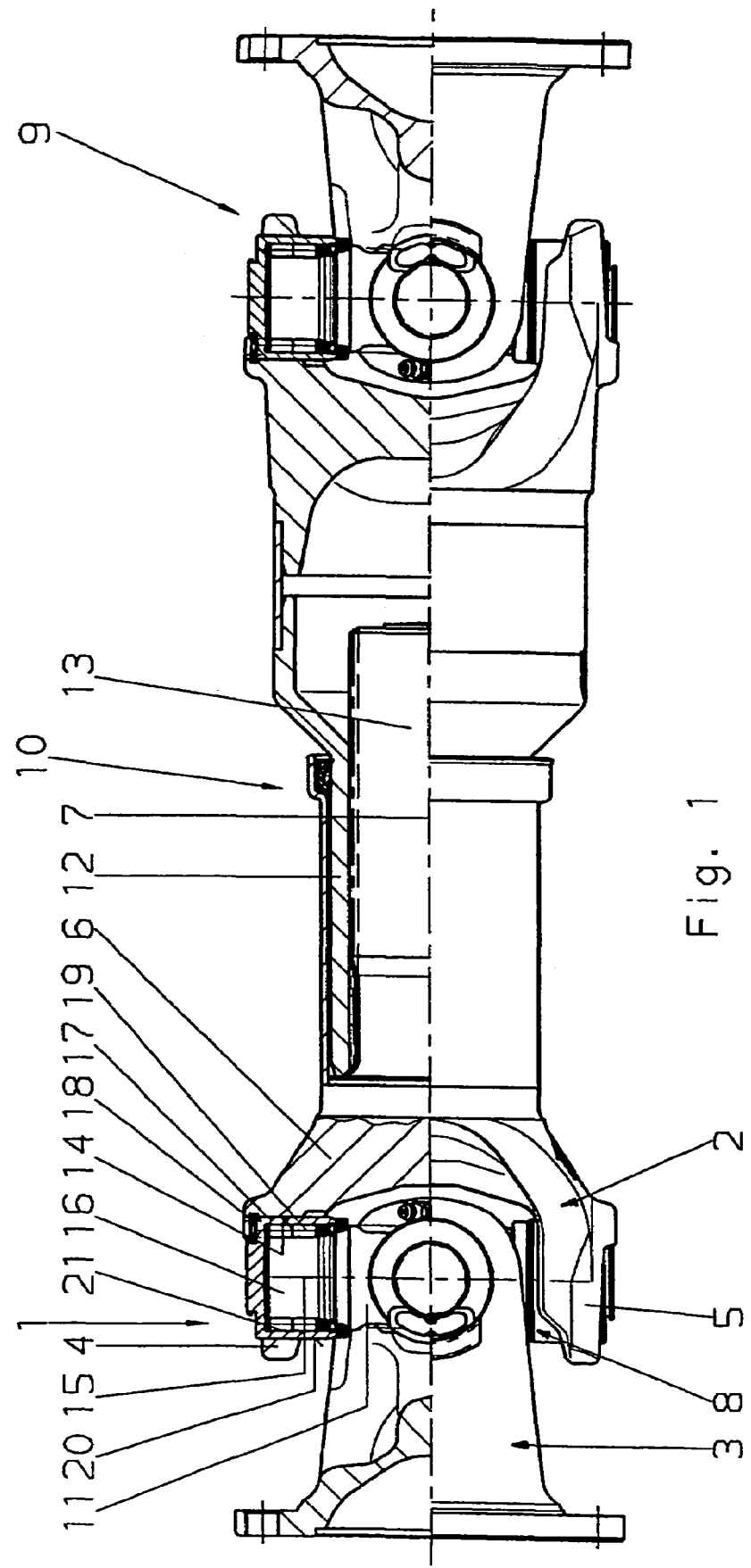
FIG. 1 is side view, the upper half in section and the lower half in elevation, of a shaft including a first embodiment of a universal joint in accordance with this invention.

Referring now to the drawings, there is illustrated in FIG. 1 a shaft including a first embodiment of a universal joint, indicated generally at 1, in accordance with this invention. The first universal joint 1 includes a first joint yoke 2 and a second joint yoke 3. The first and second joint yokes 2 and 3 may, if desired, be formed having basically same construction. Thus, only the first joint yoke 2 is described in detail herein. The first joint yoke 2 includes a first yoke arm 4 and a second yoke arm 5, as well as a base portion 6. The two yoke arms 4, 5 are formed integrally with or otherwise attached to the base portion 6. The base portion 6 is centered on a longitudinal axis 7. The two yoke arms 4, 5 are offset in opposite directions from the longitudinal axis 7 and start, respectively, from the base portion 6. The two joint yokes 2, 3 of the first universal joint 1 are connected to each other by a journal cross assembly, indicated generally at 8, in an articulatable manner.

The universal joint shaft shown in FIG. 1 also includes a second universal joint 9 that may, as illustrated, correspond in principal to the design of the first universal joint 1. The two universal joints 1, 9 are connected to each other by a length compensation assembly, indicated generally at 10, so that the distance between the two universal joints 1 and 9, and especially between their centers of articulation, can be changed corresponding to the articulation conditions and operating conditions during operation, for example in a rolling mill. The illustrated length compensation assembly 10 includes a profiled sleeve 12 that can, directly or via an intermediate tube (not shown), be connected to a joint yoke of the second universal joint 9. The sleeve 12 has an inner profile including a toothing that extends parallel to the longitudinal axis 7, on which all components of the shaft are shown centered, and wherein the two universal joints 1 and 9 are shown in the non-articulated condition. The length compensation assembly 10 further includes a trunnion 13 that is profiled on the outside corresponding to the inner profile of the sleeve 12 so that the same rests in the sleeve 12 and is displaceable along the longitudinal axis 7. Additionally, a sealing sleeve, not represented in detail, is provided for sealing the length compensation assembly 10 against the entering of dirt or the exiting of lubricant, respectively.

Figure 2:
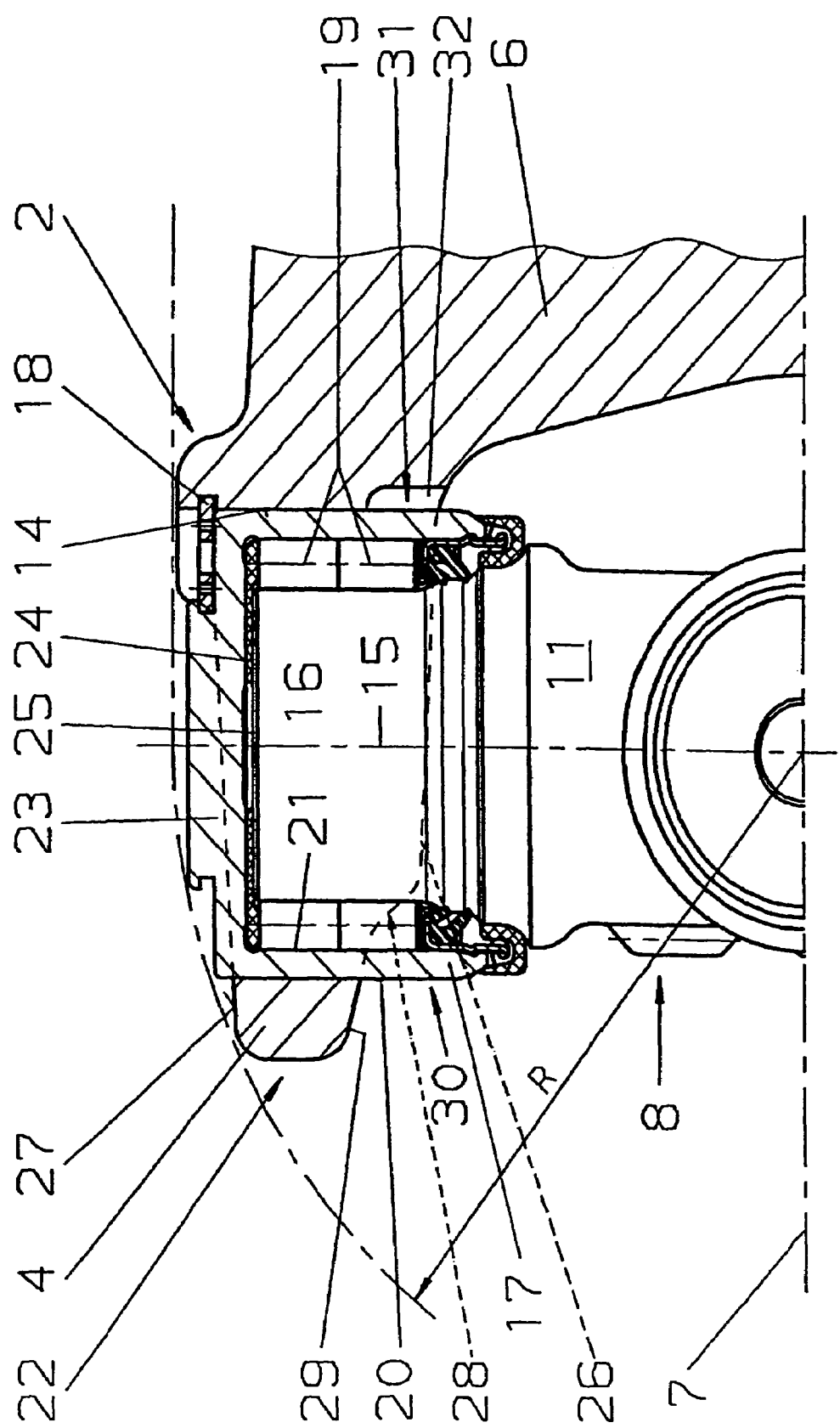
FIG. 2 is an enlarged sectional elevational view of a portion of the first embodiment of the universal joint illustrated in FIG. 1.
Figure 3:
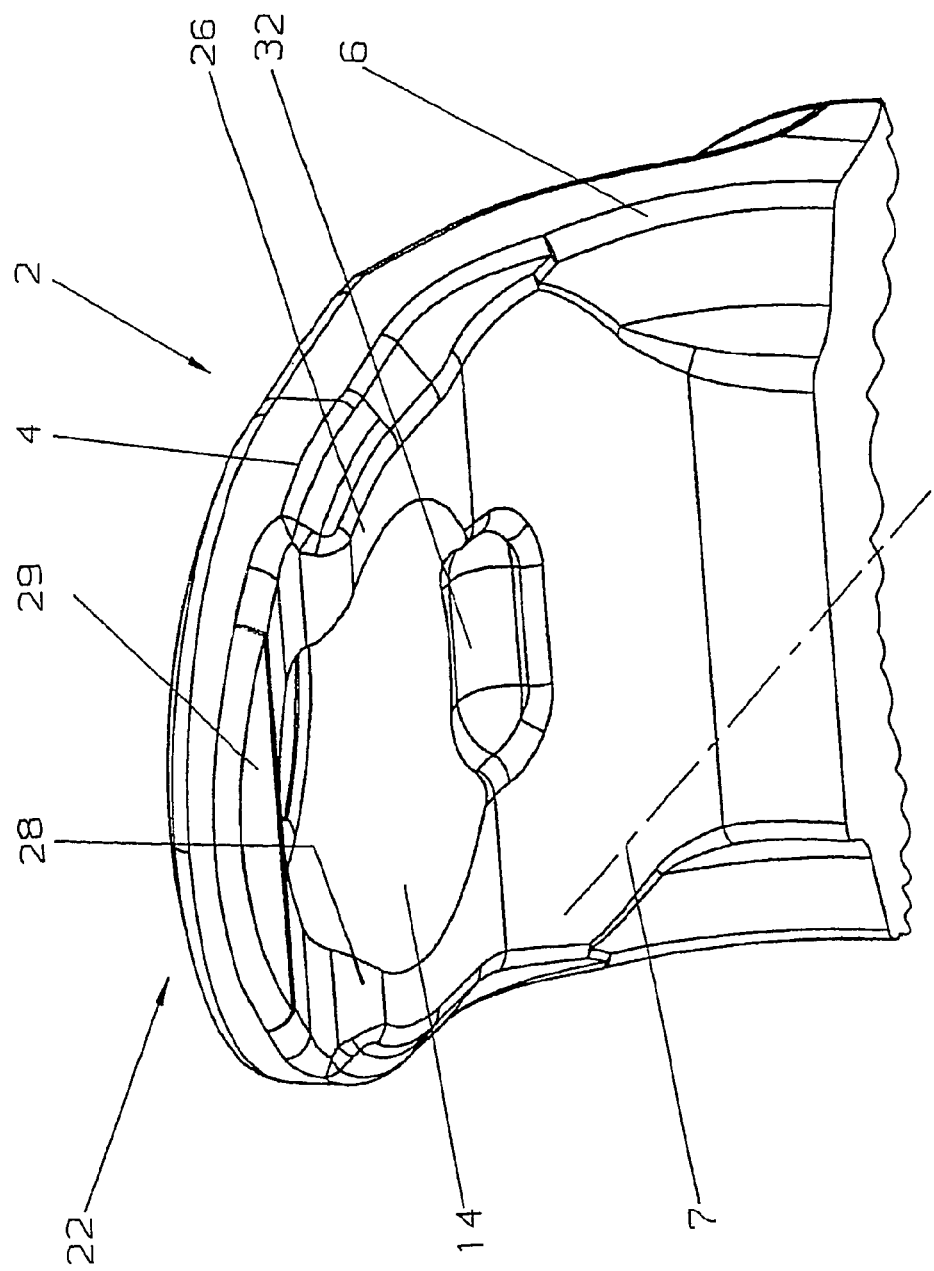
FIG. 3 is an enlarged inverted perspective view of a portion of a yoke of the first embodiment of the universal joint illustrated in FIGS. 1 and 2.

Referring back to the first universal joint 1 and in particular to FIGS. 2 and 3, it can be seen that the first joint yoke 2 has a bearing bore 14 formed through the first yoke arm 4. The illustrated bearing bore 14 is generally circular and cylindrical and is centered on an axis 15 that intersects the longitudinal axis 7 at a right angle. In the bearing bore 14, a bearing bushing 17 is accommodated. The bearing bushing 17 is closed by a bottom 23. The bearing bushing 17 is retained in its position in radial direction to the longitudinal axis 7 by a securing element 18 in relation to the first yoke arm 4. The bearing bushing 17 has a circular cylindrical bore 21 in which a journal cross 11 of the journal cross assembly 8 is pivotably supported by one of its four trunnions 16 by means of interposition of rolling members 19, formed as rollers in the illustrated embodiment, around the axis 15. The journal cross 11 includes four of such trunnions defining two axes that are arranged on a common plane. Typically, as illustrated, the first two trunnions 16 are connected to the first joint yoke 4 and are arranged on the common axis 15. The axes of the two other trunnions, that are arranged at a right angle thereto, may be arranged offset to the first trunnions 16 axially along the longitudinal axis 7. For these two other trunnions as well, a common axis is formed on which they are centered. The bearing arrangement of each trunnion 16 is sealed by a seal, which is conventional and, therefore, not described in detail.

The specific design of the accommodation of all of the bearing bushings is described in detail by means of the bearing bushing 17 that is accommodated in the bearing bore 14 of the first yoke arm 4, as being representative for the other bearing bushings arranged on the other trunnions, in the following and by means of FIG. 2, in which this bearing bushing 17 is shown in an enlarged scale in relation of FIG. 1. In the further description, it is also referred to FIG. 3 so as to be able to see the individual components better.

As mentioned above, the first yoke arm 4 can be formed integrally with the base portion 6, for example by means of forging. The first yoke arm 4 has a free end, indicated generally at 22, that is remote from the base portion 6. The bearing bore 14 extends through the first yoke arm 4, with its axis 15 intersecting the longitudinal axis 7 at a right angle. The first yoke arm 4 has, on its inner side, an inner face 26 and, on its outer side, an outer face 27. The inner face 26 faces toward the longitudinal axis 7. In this area, as especially visible from FIG. 3, a step portion 29 is provided. In the bearing bore 14, the bearing bushing 17 is accommodated with its envelope face 20, representing its outer circumferential surface being generally cylindrical in shape. Furthermore, it can be seen that the bearing bushing 17 is closed by the bottom 23 and is secured in the bearing bore 14 by a securing element 18, so that its position is kept aligned to the longitudinal axis 7 after assembly.

Between the bottom 23 of the bearing bushing 17 and an end face 25 of the trunnion 16, a front support disc 24 is arranged. The front support disc 24 can, for example, be a conventional thrust washer that is manufactured from a material with a low frictional resistance.

Further, the circular cylindrical bore 21 in the bearing bushing 17 is centered on the axis 15, on which wall the rolling members 19 in form of rollers roll, which rolling members 19 otherwise are supported radially inside in reference to the axis 15 on the circular cylindrical outer face of the trunnion 16 of the journal cross 11.

As best shown in FIG. 3, a first recess 28 is provided in the first yoke arm 4 toward the free end 22 thereof, extending in a direction toward the inner face 26. The first recess 28 provides a free opening to the bearing bore 14. Therefore, as especially visible from FIG. 2, the bearing bushing 17 experiences no support in the area of the first recess 28. Thus, a first support-free portion, indicated generally at 30, is formed. The first recess 28, as already described in connection with the state of the art and the criticism thereto, is necessary to be able to mount the journal cross 11, which outer dimensions measured over the front trunnion end faces 25 are relatively large in relation to the free width between the inner faces 26 of the two yoke arms. For example, for the two yoke arms 4 and 5, the trunnion 16 is inserted via this recess 28 initially into the bearing bore 14 before the bearing bushing 17 is mounted with the rolling members 19 from the outside.

According to this invention, diametrically to the first support-free portion 30, a second support-free portion, indicated generally at 31, is provided. In the first embodiment of this invention illustrated in FIGS. 2 and 3, the second support-free portion 31 is represented by a second recess 32 that formed in the area towards the base portion 6. Preferably, the two support-free portions 30 and 31 have the same dimensions, although such is not required. The second support-free portion 31 is essentially achieved by a grove-like design of the second recess 32. Between the first and second support free portions 30 and 31, a pair of support portions 35 and 36 are defined, as best shown in FIG. 3A. The support portions 35 and 36 are oriented transversely relative to the longitudinal axis 7 and extend over an angle around the circumference of at least 90° around the axis of the bearing bore 14. The yoke arms of all joints yokes of the shaft shown in FIG. 1 can have such an embodiment.

Figure 4:
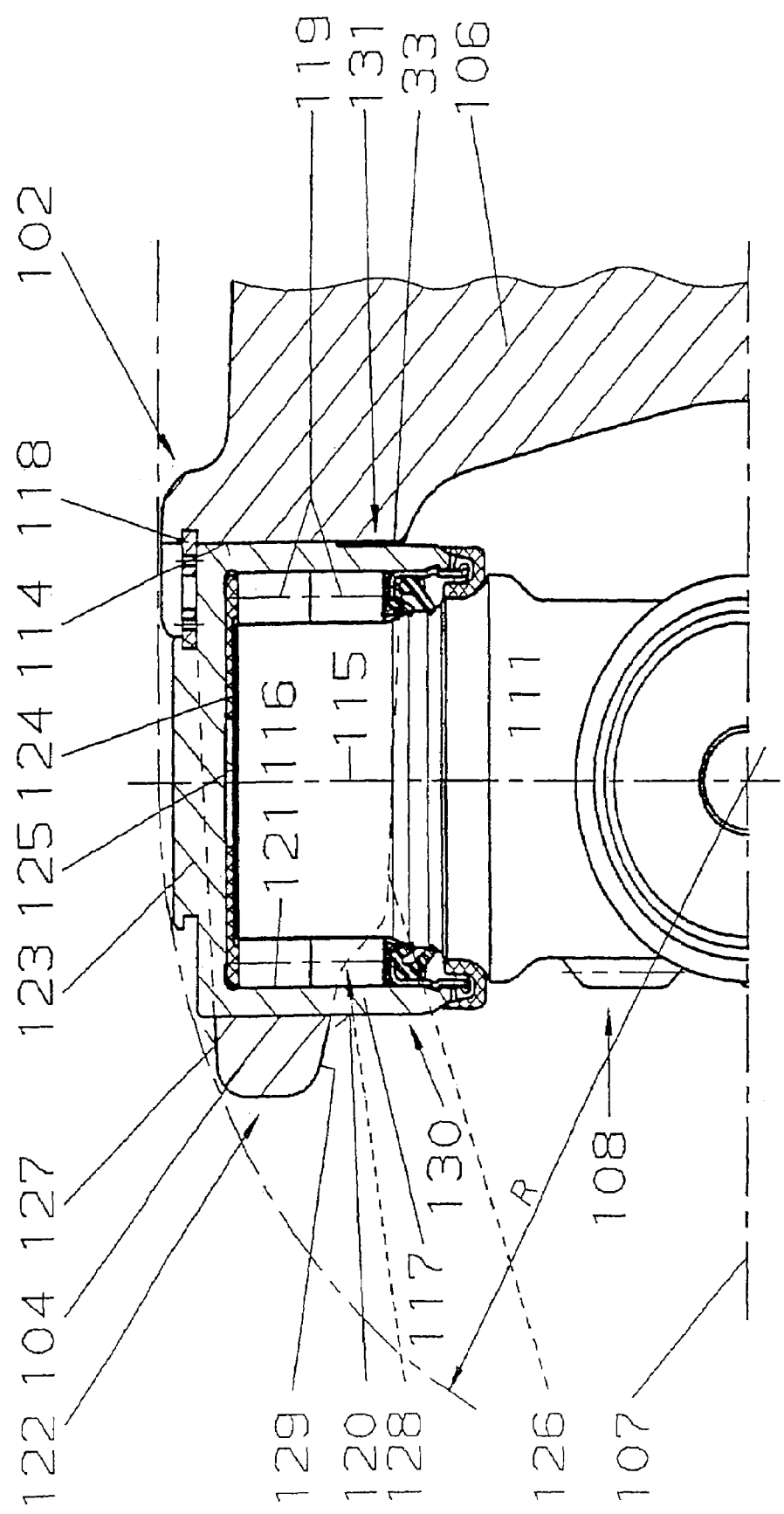
FIG. 4 is an enlarged sectional elevational view similar to FIG. 2 of a portion of a second embodiment of a universal joint in accordance with this invention.

However, an alternative embodiment for achieving the second support-free portion is possible. Such an alternative is described in more detail in connection with FIG. 4. However, concerning the rest of the portions, the description of FIGS. 2 and 3 concerning comparable components and design features, is valid, wherein, however, in FIG. 4 reference numerals, which are increased by the numerical value 100 compared to comparable components and design features of FIGS. 2 and 3, are used for such components. For their description, it is especially referred to the description of FIGS. 2 and 3. Following, the differences in reference to the second support-free portion 131 are described in more detail. Instead of the second recess 32, which is diametrically arranged to the first recess 28, the second support-free portion 131 is formed by a flattened face 33 on the envelope face 120 of the bearing bushing 117, wherein in the rotational direction around the axis 115, the bearing bushing 117 is aligned in such a way that the flattened face 33 is diametrically arranged to the first recess (see reference numeral 28 in FIG. 3). In such a case, it should be ensured that the securing element 118 also effects a rotational retainment of the bearing bushing 117 around the axis 115.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A universal joint comprising:
a first joint yoke and a second joint yoke having respective base portions that are centered on respective longitudinal axes, each of the joint yokes having two yoke arms that are attached on the respective base portions and are off-set in opposite directions from the longitudinal axis,
each of the yoke arms ending in a free end and having an inner face facing toward the longitudinal axis and an outer face facing away from the inner face,
each of the yoke arms having a circular cylindrical bearing bore extending between the outer face and the inner face, the bearing bores being arranged on a common axis intersecting the longitudinal axis at a right angle,
the inner face of each of the yoke arms having a first recess that is open toward the free end and that ends in the corresponding bearing bore, and
a journal cross assembly including a journal cross having four circular cylindrical trunnions arranged at right angles toward each other, each trunnion supporting a bearing bushing having a cylindrical envelope face and a cylindrical bore, the bearing bushings being supported on the trunnions by rolling members,
wherein the envelope face, in the area of the first recess, has a first support-free portion and, diametrically to the first support-free portion, a second support-free portion that is provided between the bearing bushing and the corresponding bearing bore,
wherein the envelope face is supported in the bearing bore by circumferential support portions that are oriented transversely relative to the longitudinal axis and that are provided between the first and second support-free portions, each support portion extending over an angle around the circumference of at least 90° around the axis of the bearing bore.

2. The universal joint defined in claim 1 wherein the second support-free portion corresponds dimensionally to the first support-free portion.

3. The universal joint defined in claim 1 wherein the second support-free portion is provided by a second recess that is arranged toward the base portion in the inner face of the yoke arms and that ends diametrically to the first recess in the bearing bore.

4. The universal joint defined in claim 1 wherein the second support-free portion is formed by a flattened face or a recess in the envelope face of the bearing bushing.

5. A yoke for use in a universal joint comprising:
a base portion having first and second yoke arms projecting therefrom, each of the first and second yoke arms ending in a free end and having an inner face and an outer face, each of the first and second yoke arms having a bearing bore formed therethrough that extends between the outer face and the inner face,
wherein the inner face of the first yoke arm has a first recess that is open toward the free end and ends in the corresponding bearing bore, the first recess forming a first support free portion, and
wherein the inner face of the first yoke arm has a second recess that is open toward the base portion and ends in the corresponding bearing bore, the second recess being formed diametrically to the first recess, the second recess forming a second support free portion,
wherein circumferential support portions that are oriented transversely relative to the longitudinal axis are provided between the first and second support-free portions, each support portion extending over an angle of at least 90° around the bearing bore.

6. The yoke defined in claim 5 wherein the second recess corresponds dimensionally to the first recess.

7. The yoke defined in claim 5 wherein the inner face of the second yoke arm has a first recess that is open toward the free end and ends in the corresponding bearing bore, and wherein the inner face of the second yoke arm has a second recess that is open toward the base portion and ends in the corresponding bearing bore, the second recess being formed diametrically to the first recess.

8. The yoke defined in claim 7 wherein the second recess in the first yoke arm corresponds dimensionally to the first recess in the first yoke arm, and wherein the second recess in the second yoke arm corresponds dimensionally to the first recess in the second yoke arm.

* * * * *